US012650921B1

(12) United States Patent
Kazemi Koohbanani et al.

(10) Patent No.: US 12,650,921 B1
(45) Date of Patent: Jun. 9, 2026

(54) GLOBAL HEAP SIZE COORDINATION OF GARBAGE COLLECTED WORKLOADS

(71) Applicant: Oracle International Corporation, Redwood Shores, CA (US)

(72) Inventors: Arash Kazemi Koohbanani, Zurich (CH); Alexander Ulrich, Freiburg (DE); Christian Haeubl, Linz (AT); Harshad Kasture, Sunnyvale, CA (US); Aleksei Kashuba, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/218,558

(22) Filed: May 26, 2025

(51) Int. Cl.
*G06F 12/02* (2006.01)
(52) U.S. Cl.
CPC .... *G06F 12/0253* (2013.01); *G06F 2212/702* (2013.01)
(58) Field of Classification Search
CPC ........... G06F 12/0253; G06F 2212/702; G06F 12/0276; G06F 12/0269
See application file for complete search history.

(56) References Cited

U.S. PATENT DOCUMENTS

| | | | | |
|---|---|---|---|---|
| 2002/0095453 A1* | 7/2002 | Steensgaard | ........ | G06F 12/0269 718/107 |
| 2005/0102657 A1* | 5/2005 | Lewis | ................. | G06F 9/45516 711/170 |
| 2007/0136402 A1* | 6/2007 | Grose | ................. | G06F 12/0253 |

| | | | | |
|---|---|---|---|---|
| 2008/0243969 A1* | 10/2008 | Wintergerst | ........ | G06F 11/3466 |
| 2009/0037501 A1* | 2/2009 | Nishiyama | .......... | G06F 12/0269 |
| 2009/0112952 A1* | 4/2009 | Adams, III | ......... | G06F 12/0276 |
| 2010/0228796 A1* | 9/2010 | Goetz | ................. | G06F 12/0253 711/170 |
| 2014/0033213 A1* | 1/2014 | Hudson | ............... | G06F 12/0253 718/102 |
| 2015/0127623 A1* | 5/2015 | Gracie | ................ | G06F 12/0253 707/693 |

(Continued)

OTHER PUBLICATIONS

Java, S. E. "HotSpot virtual machine garbage collection tuning." URL http://www. oracle. com/technetwork/java/javase/gc-tuning-6-140523. html.(Zitiert auf den Seiten 20, 21, 40 und 79) (6). (Year: 2024).*

*Primary Examiner* — William P Bartlett
(74) *Attorney, Agent, or Firm* — Hickman Becker Bingham Ledesma LLP; Stephen J. Walder, Jr.

(57) ABSTRACT

Mechanisms are provided for dynamically modifying maximum heap sizes of local memory heaps. A plurality of applications execute that each have a corresponding local garbage collector in a plurality of local garbage collectors. A global garbage collection manager executes and communicates with the local garbage collectors. The global garbage collection manager maintains global statistics information that includes statistics information communicated to it from each of the local garbage collectors. A first local garbage collector, associated with a first application, communicates first statistics information of the first application, in response to a first local garbage collection operation executed by the first local garbage collector, to the global garbage collection manager. The global garbage collection manager dynamically modifies a heap size associated with the first application based on the first statistics information and the global statistics information.

20 Claims, 7 Drawing Sheets

(56) References Cited

U.S. PATENT DOCUMENTS

| | | | | |
|---|---|---|---|---|
| 2016/0070593 A1 * | 3/2016 | Harris | ................. | G06F 9/45558 |
| | | | | 718/106 |
| 2018/0322048 A1 * | 11/2018 | Horie | ...................... | G06F 11/34 |
| 2019/0138441 A1 * | 5/2019 | Gschwind | ............. | G06F 9/5016 |
| 2024/0345952 A1 * | 10/2024 | Stephens | ............. | G06F 12/0253 |

* cited by examiner

| Statistic | Collect. Lvl. | Uses |
|---|---|---|
| Used Heap Size Before and After GC | Garbage Collector | Used to determine the actual memory requirements of the application |
| Historical Max Memory Usage Before and After GC | Garbage Collector | Used to track changes in application behavior over periods of time |
| Current Heap Size (Young Gen, Old Gen) | Garbage Collector | Displays current memory pressure and internal split between short and long term allocations |
| Maximum Heap Size | Garbage Collector | |
| Committed Memory | Garbage Collector | GC may keep extra memory for performance reasons, the spare memory can be freed and released on demand |
| Percentage of Time Spent in GC | Garbage Collector | Spending too much time in GC can impact performance of the application, this metric may be used to estimate latency and throughput |
| Application Latency and Throughput | Cloud Runtime | Cloud runtime has an end-to-end view of the application and related performance metrics that should be optimized |
| Memory Usage | Cloud Runtime | End goal is to optimize this value that is mostly influenced by heap size |

Figure 7:
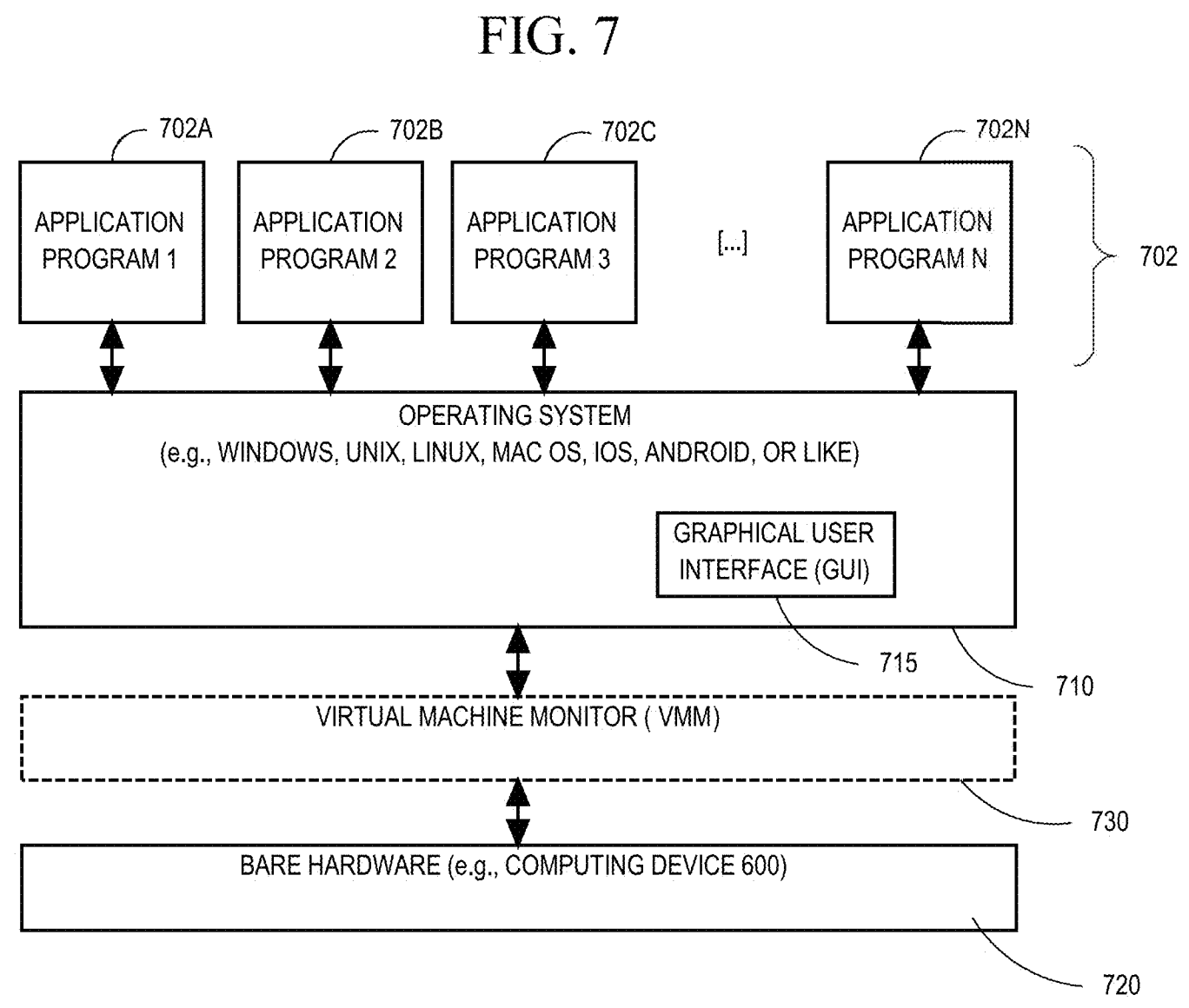

APPLICATION PROGRAM N

702C

APPLICATION PROGRAM 3

702B

APPLICATION PROGRAM 2

702A

APPLICATION PROGRAM 1

[...]

OPERATING SYSTEM (e.g., WINDOWS, UNIX, LINUX, MAC OS, IOS, ANDROID, OR LIKE)

GRAPHICAL USER INTERFACE (GUI)

710

715

VIRTUAL MACHINE MONITOR ( VMM )

730

BARE HARDWARE (e.g., COMPUTING DEVICE 600)

720

GLOBAL HEAP SIZE COORDINATION OF GARBAGE COLLECTED WORKLOADS

FIELD OF THE INVENTION

The present invention relates to optimization of heap size across multiple applications running in a managed computing environment, and more specifically to improving application execution in managed computing environments as well as reducing the footprint of applications by dynamically modifying application heap sizes to avoid out-of-memory errors while minimizing latency by minimizing garbage collection operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Garbage collection is a process used in computer programming to automatically manage memory by reclaiming space that is no longer in use. Garbage collection identifies objects or data that are no longer accessible (i.e., no references point to them) and frees up that memory so it can be used by the application again. This helps prevent memory leaks, which occur when unused memory is not properly released.

The garbage collection process is implemented by a garbage collector (GC) which runs as a background process checking for unused objects and collecting them. That is, the GC performs a reference check to find objects that are no longer accessible from any thread or static reference. The GC then performs a mark-and-sweep/copying/compacting operation which, depending on the GC algorithm, marks unused memory, moves live objects (if needed), and frees-up the memory occupied by the data objects. This process is typically automatic in high-level programming languages, such as Java, Python, and C#, thereby relieving developers from manually managing memory. However, garbage collection operations and GCs can introduce some performance overhead, as the GC must periodically run and analyze the application's memory usage in order to perform the garbage collection.

A heap is a region of memory used for dynamic memory allocation. Unlike the stack, the heap allows for flexible allocation and deallocation of memory blocks, making it suitable for storing data that outlives a function's execution, or for storing large data structures that are not known at compile time. An example of a heap is the Java heap, which is a region of memory used by a Java Virtual Machine (JVM) to store objects and class instances that are created during the runtime of a Java application. The purpose of the Java heap is to be the main area for dynamic memory allocation in Java. When a Java application creates an object, memory for that object is allocated from the Java heap, which is shared among all threads of the Java application.

In some cases, the Java heap is divided into different generations, e.g., a young generation that stores short-lived objects, an old (tenured) generation that stores long-lived objects, and an optional permanent generation or metaspace that stores class metadata. With regard to the young generation, this is where new objects are created. The young generation may be further divided into an Eden space, where all new objects first go when created, and Survivor spaces (S0 and S1) where objects are moved when they survive a minor garbage collection operation.

A minor garbage collection (minor GC) is a frequently occurring garbage collection operation that cleans up memory of short-lived objects in the young generation of the Java heap. Objects that have survived multiple minor GC's are moved to the old "tenured" generation of the Java heap. These are usually long-lived objects which are cleaned up by major GC operations, which tend to be more expensive and take longer than minor GC operations.

The size of the Java heap size can be set using JVM parameters, e.g., "-Xms" may be used to set an initial size of the Java heap and "-Xmx" can be used to set the maximum size of the Java heap.

Efficient use of the Java heap is important to obtain good application performance. If the Java heap is too small, there may be a need for frequent garbage collection and out-of-memory (OOM) errors. If the Java heap is too large, there may be infrequent garbage collection and applications will have unnecessarily large memory footprints resulting in inefficient usage of the memory.

BRIEF DESCRIPTION OF THE DRAWINGS

In the drawings:

FIG. 2 is a diagram illustrating examples of statistical information collected by the global garbage collection manager (GGCM) in accordance with one illustrative embodiment;

FIG. 6 is a block diagram that illustrates a computer system upon which an embodiment of the invention may be implemented; and FIG. 7 is a block diagram of a basic software system that may be employed for controlling the operation of a computer system, upon which aspects of the illustrative embodiments may be implemented.

DETAILED DESCRIPTION

Figure 1:
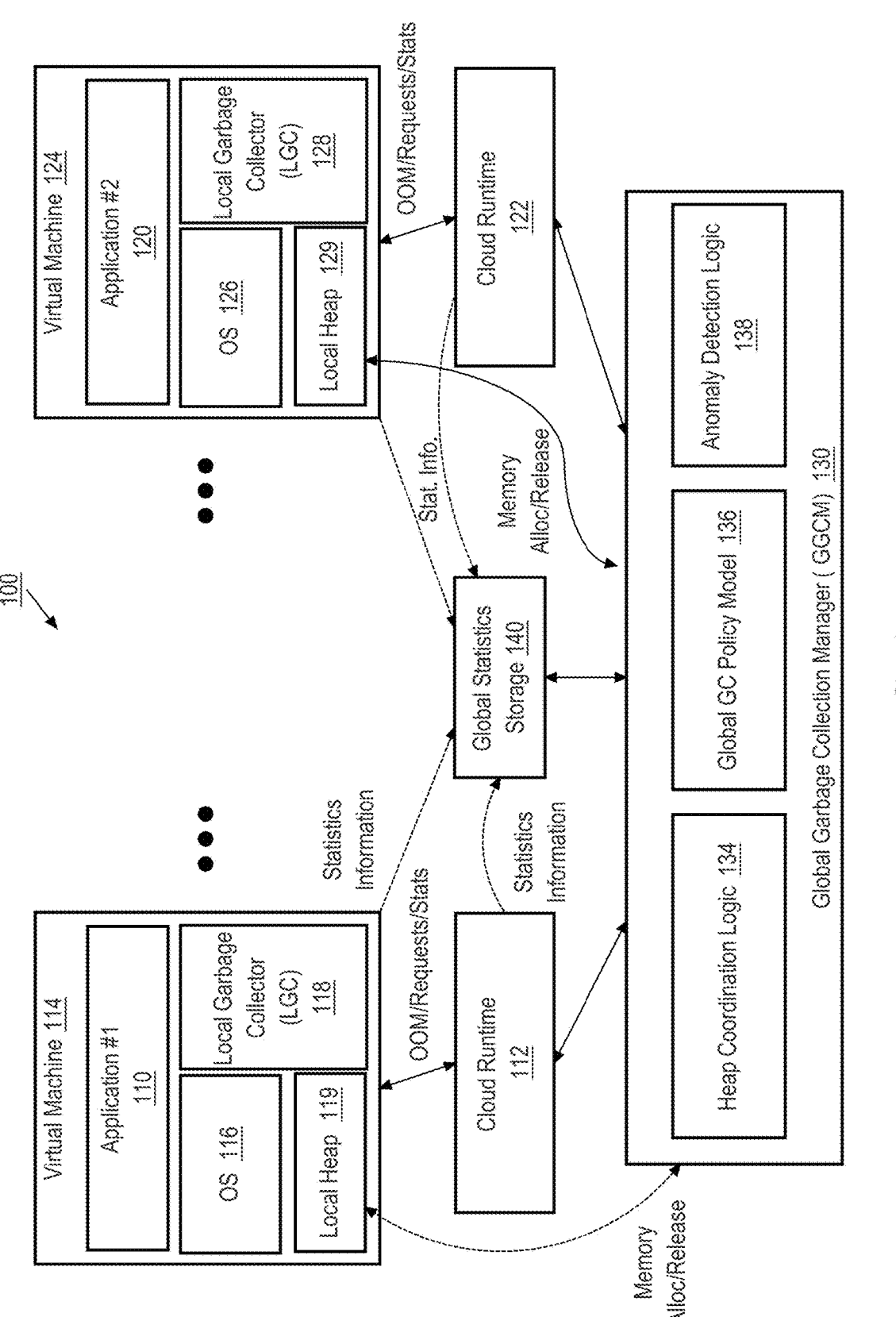
FIG. 1 is example block diagram of a global garbage collection aware architecture in accordance with one illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments are directed to methods, computer program products, and apparatus specifically configured to optimize heap size across multiple applications running in a managed cloud environment. More specifically, the illustrative embodiments provide mechanisms to dynamically optimize heap size based on a global view of memory footprint and performance characteristics (e.g., latency and throughput) of the applications running in the managed cloud environment. The illustrative embodiments operate to dynamically adjust the heap size of virtual machine native images for better performance and out-of-memory (OOM) resiliency, as well as reducing the footprint of applications such that more applications can run with the same amount of total memory.

For purposes of the following description, examples of the illustrative embodiments will make reference to the Java programming language, Java applications running on Java Virtual Machines (JVM), and a Java heap providing dynamic memory allocation capabilities for Java applications, as one example of a runtime environment in which aspects of the illustrative embodiments may be implemented. It should be appreciated that other runtime environments may be used, such as other programming languages, applications, virtual machines (VMs), and memory heaps, without departing from the spirit and scope of the present invention.

Assuming a Java runtime environment, it should be appreciated that the maximum heap size for a Java application is set by the JVM when the JVM is started, and is configured through the "-Xmx" command-line option, or is set to a default maximum heap size based on the available memory. Under current implementations, the maximum heap size of a Java application cannot be changed at runtime. Thus, if a workload changes during runtime, and requires more memory than the maximum heap size, the JVM needs to be restarted and configured with the correct-Xmx option. Hence, it is important to set the maximum heap size appropriately when the JVM and Java application are started in order to ensure that the Java application runs appropriately and does not encounter out-of-memory (OOM) errors. An OOM error occurs when an application does not have sufficient memory allocated to it to run the application and thus, the allocated memory has been exceeded.

However, estimating the maximum memory usage of an application is a difficult task. As a result, most of the time in order to ensure that an OOM error does not occur, a developer chooses a value that is much higher than what is actually needed by the application and much higher than the actual memory usage of the application. Thus, memory resources may be wasted. Moreover, Java heap memory usage of an application can vary significantly over time, depending on how much load there is on the application. If the maximum heap size of each application is set to a higher amount so as to accommodate these peaks in Java heap memory usage, a small number of applications can have a large footprint. As a result of the maximum heap size being set to a higher than needed setting, garbage collection is not performed efficiently to reclaim memory that is not being used, but is allocated, to an application. Hence, the applications present higher memory footprints, i.e., larger heap size allocations, because garbage collections are less frequent.

If it were possible to dynamically adjust the maximum heap size of an application, e.g., a Java application, then it would be possible to optimize the memory footprint as well as prevent OOM issues. However, such dynamic adjustment of the maximum heap size should not come at the cost of throughput or latency, which are equally important to the application and are influenced by the garbage collector policy. For example, restarting the virtual machine to reset a maximum heap size would negatively impact throughput or latency and is not a practical solution.

In accordance with one or more of the illustrative embodiments described herein, a method, computer program product, and apparatus are provided in which a plurality of applications, executing in a managed cloud computing environment, are configured to each have a corresponding local garbage collector. Each local garbage collector operates in a siloed manner with regard to its corresponding application and virtual machine, but is globally aware in that it is configured to communicate with a global garbage collection manager and receive communications from the global garbage collection manager to facilitate heap allocation across multiple different siloed applications, their associated local garbage collectors, and virtual machines of one or more cloud runtimes in a managed cloud computing environment.

In accordance with one or more illustrative embodiments, the global garbage collection manager maintains global statistics information comprising statistics information communicated to the global garbage collection manager from each of the local garbage collectors. That is, in response to a local garbage collector, associated with an application and virtual machine, performing a garbage collection operation, the garbage collector collects local statistics information for that application (e.g., throughput and latency) and its allocated memory, or heap. Each siloed application and virtual machine has its own local heap having a maximum heap size set when the virtual machine initiates the application. The local garbage collector communicates the local statistics information to the global garbage collection manager. These local statistics may be stored in a shared memory or managed cloud computing environment memory accessible by each of the local global collectors executing with regard to each of the applications/virtual machines of the managed cloud computing environment. The global garbage collection manager uses the statistics information in this global statistical information storage to execute global garbage collection policies.

The global garbage collection manager operates on the collected local statistics information maintained in the global statistics information storage to respond to requests from applications for more memory, out-of-memory (OOM) errors, and the like. The global garbage collection manager operates to respond to such incidents with reallocations of global maximum heap size to applications from a shared memory by signaling applications to release memory, and reallocate heap sizes to minimize OOM errors and facilitate requests for more memory while maintaining application throughput and minimizing latency. The global maximum heap size may be stored in the global storage statistics.

This dynamic adjustment of maximum heap sizes is performed while the applications are executing in the managed cloud computing environment, and without restarting the virtual machines associated with the applications. As noted previously, current mechanisms set the maximum heap size when the virtual machine is initiated. The illustrative embodiments provide a global garbage collection manager that is able to reset, and balance, maximum heap sizes amongst a plurality of applications executing in the managed cloud computing environment. Thus, while local garbage collectors operate to manage memory usage in the local siloed application's virtual machine environment given the maximum heap size allocated by the global garbage collection manager, the global collection manager operates to balance and dynamically adjust maximum heap sizes across multiple local virtual machine environments.

As mentioned above, in accordance with one or more illustrative embodiments, the local garbage collectors, such as in response to a garbage collection operation completing, a garbage collection safe-point being reached, or the like, communicates local statistics information from the local garbage collector to the global garbage collection manager via a mechanism provided by the cloud runtime of the managed cloud computing environment. A garbage collection safe-point is a specific point in the execution of an application where the garbage collector can safely pause and collect garbage without disrupting the application's state, i.e., without causing inconsistencies or crashes of the application.

In accordance with one or more illustrative embodiments, the statistics information comprises memory usage statistics and application performance statistics. For example, the statistics information may comprise one or more of used heap size before and after garbage collection, historical maximum memory usage before and after garbage collection, current heap size, maximum heap size, committed memory, percentage of time spent in garbage collection, application latency and throughput, and/or memory usage. The global garbage collection manager stores, for each application executing in the managed cloud computing environment, historical statistical information comprising the statistics information communicated from the local garbage collectors of the applications. This historical statistical information is collected over period of time which may be equal to or less than the time period that the application is running in the managed cloud computing environment.

The historical statistical information may be stored in a shared memory or a cloud runtime memory associated with the managed cloud computing environment, which the local garbage collectors may access directly. The global statistics information, in some illustrative embodiments, comprises an array data structure where each slot of the array data structure is aligned to a cache line and stores statistics information of a corresponding application running in the managed cloud computing environment.

This historical statistical information may be used as a basis for the global garbage collection manager to implement one or more global garbage collection management policies that dynamically modify the maximum heap sizes associated with one or more of the applications running in the managed cloud computing environment. Moreover, this historical statistical information may also be used by the global garbage collection manager to perform anomaly detection with regard to one or more of the applications running in the managed cloud computing environment. This anomaly detection may include, for example, detecting an anomaly in response to a request for additional memory from an application requesting a predetermined larger amount of memory than a historical maximum memory usage by the application, e.g., 20% higher memory allocation request. In response to such a detected anomaly, the request may be denied by the global garbage collection manager and an out-of-memory (OOM) error may occur with regard to the application requesting the additional memory.

The global garbage collection manager, in accordance with one or more illustrative embodiments, may initiate a global garbage collection operation across all of the plurality of local garbage collectors. This may occur in response to a request from a garbage collector for more memory allocation to a corresponding application, i.e., a maximum heap size modification. This may also occur periodically or continuously based on the current and/or historical statistical information obtained from the various local garbage collectors. In some cases, the request for additional memory allocation may originate from a local garbage collector in response to the application being out-of-memory (OOM)

and having reached its maximum heap size but not yet having thrown an OOM error.

The global garbage collection operation may inform the local garbage collectors (LGCs) to perform a garbage collection. The global garbage collection operation may comprise the global garbage collection manager signaling applications in the managed cloud computing environment to free one or more memory chunks allocated to them and which are not being used by these applications. The freed memory chunks may then be used to modify the maximum heap sizes associated with the applications by reducing maximum heap sizes of applications by an amount corresponding to the size of the memory freed and then reallocating the freed memory to an application whose memory usage exceeds the current maximum heap size of the application, and then increasing the maximum heap size accordingly. This operation balances maximum heap size amongst the various applications running in the managed cloud computing environment so that it is appropriately set for the actual and/or historical memory usage of the applications.

In some illustrative embodiments, the global garbage collection manager dynamically modifies the maximum heap sizes of the running applications based on a global garbage collection policy. In some implementations, the global garbage collection policy comprises: (1) setting a maximum global memory limit that is available to use by the plurality of applications; (2) in response to the first application requesting additional memory, checking whether the maximum global memory limit is reached; (3) in response to the maximum global memory limit not being reached, allocating additional memory to the first application to dynamically modify the heap size; and (4) in response to the maximum global memory limit having being reached, triggering an out-of-memory error. In some implementations, the global garbage collection policy further comprises: (5) in response to the triggering of an out-of-memory error, determining whether a second application in the plurality of applications is using a fraction of a second heap allocated to the second application; and (6) in response to the second application using a fraction of the second heap, releasing back to the global garbage collection manager, a portion of the second heap not being used by the second application and reducing the maximum heap size of the second heap.

In some illustrative embodiments, the global garbage collection manager dynamically modifies the maximum heap sizes of the various applications based on characteristics of the workloads executed by the applications. For example, the dynamic modifications may be continuously performed based on these workloads such that maximum heap sizes allocated to applications whose workloads require larger amounts of memory are greater than the maximum heap sizes allocated to applications that run lightweight workloads.

In some illustrative embodiments, the global garbage collection manager may implement one or more trained machine learning computer models that operate on the characteristics of the workloads of the applications, the historical statistical information from the various applications, the current statistical information of the applications as communicated by the local garbage collectors, and other features to predict an optimal setting of a maximum heap size for one or more of the applications running in the managed cloud computing environment. For example, the machine learning computer model may be trained to evaluate, for a given application requesting additional memory allocation, e.g., a larger heap size, how to rebalance the shared memory allocation to the various applications based on the current and historical memory usage and other factors, such as the current and historical statistical performance and memory usages statistics discussed above, to determine how to increase maximum heap size for the requesting application by modifying the maximum heap size of one or more other applications, e.g., signaling other applications to release unused memory blocks.

Thus, the illustrative embodiments provide mechanisms to dynamically modify the maximum heap sizes allocated to applications running on virtual machines in a managed computing environment, such as a managed cloud computing environment. The mechanisms of the illustrative embodiments eliminate the unnecessarily large memory footprints of applications due to over-provisioning heap size to avoid out-of-memory (OOM) errors. That is, when developing an application, e.g., Java application, the developer does not need to worry about setting the maximum heap size to a large value to avoid OOM errors and thereby over-provision the application. To the contrary, the mechanisms of the illustrative embodiments operate to automatically infer an appropriate application maximum heap size at runtime.

By intelligently and autonomously modifying the maximum heap sizes of local heaps associated with applications from a global perspective using a global policy, the mechanisms of the illustrative embodiments improve OOM resiliency of the applications. For example, if a first application A has a light load, and thus does not need a lot of memory, but application B has a relatively high load, by dynamically reducing the maximum heap size of application A and dynamically increasing the maximum heap size of application B, throughput and latency of application B may be improved. That is, dynamic modification of maximum heap sizes for applications reduces the latency of the applications, increases the throughput of the applications, and avoids potential data loss. It has been found that the mechanisms of the illustrative embodiments operate to make memory consumption more stable and generally lower from a global perspective. Moreover, it has been found that with the mechanisms of the illustrative embodiments, OOM errors can be prevented, so long as there is enough spare global memory capacity.

Global Garbage Collection Aware Architecture

FIG. 1 is an example block diagram of a global garbage collection aware architecture in accordance with one illustrative embodiment. The example shown in FIG. 1 depicts an implementation in a managed cloud computing environment that is responsible for running the applications and communicating the policy decisions made by a global garbage collection manager. It should be appreciated that while a managed cloud computing environment is shown as an example and used throughout the present description, the illustrative embodiments are not limited to such a computing environment and other computing environments may be used without departing from the spirit and scope of the present invention. That is, any computing environment in which applications are run on virtual machines and have their own allocated portions of memory which may be the subject of garbage collection may be improved by the mechanisms of the illustrative embodiments.

As shown in FIG. 1, the global garbage collection (GC) aware architecture 100 comprises a plurality of applications 110 and 120 running in association with their own instances of a cloud runtime 112 and 122 of a managed cloud computing environment. These applications 110 and 120 may be separate instances of the same application or instances of different applications running in the same managed computing environment, which for purposes of the example is assumed to be a managed cloud computing environment. While only two applications 110, 120 and cloud runtimes 112, 122 are shown in FIG. 1 for simplicity, it should be appreciated that in an actual managed cloud computing environment, there may be many more applications and cloud runtime instances than those depicted in FIG. 1. The cloud runtimes 112, 122 provide the environment in which code or applications 110 and 120 are executed, including the necessary software, libraries, and resources. In the cloud-native context, in some illustrative embodiments, the cloud runtimes 112, 122 may include the container runtime, which implements the Open Container Initiative (OCI) specification.

The applications 110, 120 may be executed in a corresponding virtual machine (VM) 114, 124 having operating system (OS) 116, 126 and other resources required to execute the applications 110, 120. For example, the VMs 114, 124 may be Java Virtual Machines (JVMs) or the like, with the applications 110, 120 being Java applications. It should be appreciated that these are only examples and other virtual machines and applications may be used without departing from the spirit and scope of the present invention. The applications 110, 120 may execute any types of workloads desired by the particular implementation. In some illustrative embodiments, the application workloads comprise database workloads and/or database management system (DBMS) workloads for accessing and operating on data stored in one or more databases.

Each application 110, 120 runs with a local garbage collector (LGC) 118, 128 executing in the corresponding virtual machine 114, 124. The LGC 118, 128 is configured to be aware of, and communicate with, a global garbage collection manager (GGCM) 130. The applications 110, 120 have a corresponding amount of maximum allocated memory that forms the local heaps 119, 129 for the applications. While the local heaps 119, 129 are shown as being part of the VMs 114, 124, it should be appreciated that the physical memory may be part of a global memory resource with the local heaps 119, 129 being portions of this global memory resource.

The size of the local heaps 119, 129 represents the maximum amount of memory resources the corresponding application 110, 120 is able to use while executing. That is, while the application 110, 120 may freely request blocks of memory from its local heap 119, 129 when needed, the application 110, 120 cannot exceed the maximum size of the local heap without encountering an out-of-memory (OOM) error. This maximum heap size for the local heaps 119, 129 may be set by the developer of the application 110, 120 and may be fixed when the VM 114, 124 first initiates. Prior to the mechanisms of the illustrative embodiments described herein, this maximum heap size cannot be altered after it is configured by the VM 114, 124 without having to restart the VM 114, 124. As a result, developers typically set the maximum heap size for their applications to much larger than what may be needed by the application, so as to avoid OOM errors and frequent garbage collection operations to free memory. This results in unnecessarily large memory footprints for applications and inefficient use of the memory resources. Moreover, this results in garbage collection not being performed as frequently as needed to free memory being used by objects that are no longer in use by the applications.

The illustrative embodiments provide a specific solution to these problems that involves the globally aware LGCs 118, 128 coordinating dynamic modification of the maximum heap sizes of the local heaps 119, 129 by the GGCM 130 based on application performance and memory usage statistical information, which may include both current statistical information and historical statistical information The GGCM 130 operates to allocate portions of a shared memory resource that is shared across all the applications 110, 120 and VMs 114, 124 of the managed cloud computing environment, to the local heaps 119, 129 of those applications 110, 120 and VMs 114, 124. This allocation by the GGCM 130 may be performed as part of the initial allocation of the local heap 119, 129 to the application upon startup of the VMs 114, 124 and/or dynamically while the applications 110, 120 are executing in the managed cloud computing environment. If no value is specified for the initial allocation of the local heap 119, 129, then a default value may be utilized, which may then be optimized through operation of the illustrative embodiments.

The GGCM 130 comprises heap coordination logic 134, global GC policy model 136, and anomaly detection logic 138. In some cases, the anomaly detection logic 138 may be integrated with the global GC policy model 136 as an additional classification computer model that evaluates reported statistical information for the presence of anomalies, as discussed hereafter. The heap coordination logic 134 comprises logic for performing the necessary operations for signaling commands/instructions and otherwise communicating with the LGCs 118, 128 to facilitate dynamic modification of local heaps 119, 129, such as by increasing/decreasing the maximum heap sizes of the local heaps 119, 129 as determined by operation of the global GC policy model 136. Such communications between the LGCs 118, 128 and the GGCM 130 may include, but are not limited to, receiving statistical information communications from the LGCs 118, 128, receiving OOM error based requests for additional memory allocation to an application 110, 120, sending commands/instructions to free memory blocks, sending commands/instructions to reset maximum heap sizes of the local heaps 119, 129, and the like.

The global GC policy model 136 operates on statistical information reported by the LGCs 118, 128, and stored in a global statistics storage 140, which may be a shared memory, cloud runtime memory, or the like. The global GC policy model 136 may be, for example, a rules-based model that comprises pre-coded rules that are executed on the statistical information to make dynamic decisions, such as decisions with regard to granting/denying requests for increased allocations of memory resources to applications, decisions as to which applications should be instructed to release memory resources, and the like. In some illustrative embodiments, the global GC policy model 136 may be a machine learning computer model that is trained through a machine learning training process (examples of which are described hereafter) to specifically predict optimal maximum heap sizes for local heaps 119, 129 based on the statistical information reported by the LGCs 118, 128 and maintained in the global statistics storage 140. That is, the statistical information stored in the global statistics storage 140 and/or currently reported by one or more of the LGCs 118, 128, as well as other features deemed suitable for the particular implementation for evaluating optimal allocation of memory resources to the local heaps 119, 129, may be input to the global GC policy model 136 and, either through rules-based logic, trained machine learning computer model logic, or the like, a prediction of the optimal allocation of memory resources may be determined. This prediction or determination may then be provided to the heap coordination logic 134 to effectuate the provisioning of portions of the shared memory to the various local heaps 119, 129 accordingly. This may involve instructing LGCs 118, 128 to release memory resources from their corresponding local heaps 119, 129 back to the shared memory and reducing the maximum heap size of the corresponding local heaps 119, 129 accordingly, sending instructions to LGCs 118, 128 to increase their maximum heap size by providing an allocation of additional memory resources to the corresponding applications 110, 120, or the like. In some cases, if the global GC policy model 136 determines that a request for additional memory resources should be denied, then the heap coordination logic 134 may instruct the corresponding LGC 118, 128 to throw an OOM error.

Example Operation of the Global GC Aware Architecture

As an example of an operation of the global garbage collection (GC) aware architecture 100, consider that the LGCs 118, 128 execute in their corresponding VMs 114, 124 in a siloed manner, but are globally GC aware in that they communicate with the GGCM 130 and are configured to request additional memory resources from the GGCM 130 in response to detection of possible OOM errors occurring during the execution of the corresponding application 110, 120. Thus, the LGCs 118, 128 perform garbage collection operations to reclaim memory blocks associated with objects that are no longer being used by the corresponding application 110, 120. Such garbage collection may be performed when it is determined that the amount of free memory in the corresponding local heap 119, 129 is running low, e.g., equal to or below a predetermined threshold, when a new object allocation would exceed a predefined memory threshold, e.g., the maximum heap size of the corresponding local heap 119, 129, or at a garbage collection safe-point.

After a garbage collection operation is performed by the LGC (using LGC 118 as an example), the LGC 118 collects the statistics for the application performance and memory usage. The collected statistics information is propagated down from the LGC 118 to the GGCM 130 which, in turn, can trigger a "full" garbage collection, i.e., the most complete version of the garbage collection which cleans as much memory as possible, as opposed to a minor garbage collection on the young generation, to release memory or modify the maximum heap size. The GGCM 130 stores the statistics information reported by the LGCs 118, 128 associated with each of the applications 110, 120 executing in the managed cloud computing environment. This statistics information is stored in the global statistics storage 140, which again may be a shared memory accessible by the LGCs 118, 128.

Thus, in accordance with one or more of the illustrative embodiments, at the end of a garbage collection operation by an LGC 118, the LGC 118 may call into the GGCM 130 to report the updated statistics values for application performance statistics and memory usage statistics, as well as other garbage collection statistics regarding the garbage collection operation itself. This statistical information is stored by the GGCM 130 in the shared memory of the global statistics storage 140, which stores such statistical information for each of the applications 110, 120 that are executing in the managed cloud computing environment. In some illustrative embodiments, the global statistics storage 140 may be implemented as a cloud runtime memory which is accessible using a message passing application programming interface (API). The shared memory, or cloud runtime memory, may also be made accessible to, and shared amongst, other GGCMs (not shown) that may be part of the same managed cloud computing environment. Thus, each GGCM may have its own set of LGCs that it manages and there may be multiple GGCMs in a managed cloud computing environment.

The global statistics storage 140 may store not only the most recently reported statistical information collected from the LGCs 118, 128, but may also store historical statistical information over a period of time. For example, the historical statistical information may be collected and maintained in the global statistics storage 140 for the time period that the application 110, 120 is running in the managed cloud computing environment and may be released once the application is no longer running. In some cases, the historical statistical information may be used as a basis for computing current and/or historical global statistical information that spans all applications running in the managed cloud computing environment and this global statistical information may be maintained as separate entries in the global statistics storage 140.

The historical statistical information may be used by the GGCM 130 to implement complex global GC policies in the global GC policy model 136. This may include computation of additional measures from the historical statistical information that may drive decision making by the global GC policy model 136, e.g., computation of trends, means, averages, various patterns in the statistical information, and the like, as well as perform projections and predictions as to statistical information for future time periods based on the trends, patterns, and the like, identified in the historical and/or current statistical information.

In some illustrative embodiments, the anomaly detection logic 138 of the GGCM 130 may process the current, or most recent, reported statistical information and the historical statistical information for one or more of the applications 110, 120, to detect anomalous behaviors. For example, the anomaly detection logic 138 may comprise rules-based or machine learning based computer models that evaluate the statistical information to detect anomalies in memory usage based on newly spawned applications that are using much more memory than older instances of the same or similar applications, or even other applications running or which have previously run in the managed cloud computing environment. That is, if a newly spawned application instance requests an amount of memory resources that are a predetermined amount or more than memory resources that were allocated to a same or similar application instance previously, then this may be determined to be an anomaly, whether malicious or benign, and may be used as a basis for denying a request for additional memory resources, e.g., a larger portion of the shared memory.

Statistics Information Examples and Example Storage Array

As mentioned above, the statistics information provided by the LGCs 118, 128, and which is stored and maintained in the global statistics storage 140, both current and historical statistics information, include application performance statistics and memory usage statistics. Examples of these types of statistical information, the level from which they are collected, and the possible uses is shown in FIG. 2. As shown in FIG. 2 some of the statistical information is collected from the LGCs 118, 128 directly, such as used heap size before and after garbage collection, historical maximum memory usage before and after garbage collection, current heap size (young generation, old generation), maximum heap size, committed memory, and percentage of time spent in garbage collection. Other statistics information may be collected from the cloud runtimes 112, 122 by the GGCM 130, such as application latency and throughput and memory usage statistics information. It should be appreciated that these are only examples of the statistics information, collection levels, and potential uses of the statistics information examples and many other types of statistics information, collected at various levels, and many other types of uses of the statistics information (those depicted in FIG. 2 and additional statistics information) may be used in one or more of the illustrative embodiments without departing from the spirit and scope of the present invention.

Figure 3:
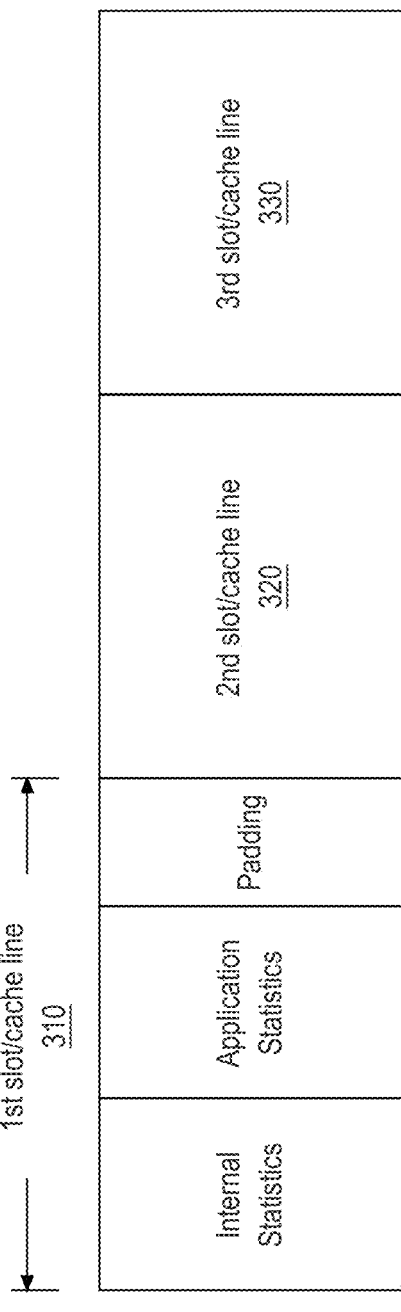
FIG. 3 is an example of a global statistics storage data structure in accordance with one illustrative embodiment.

To efficiently store the statistics in shared memory or cloud runtime memory, one or more of the illustrative embodiments may implement an array data structure. FIG. 3 is an example diagram of an array data structure that may be used to store the statistics information as part of the global statistics storage 140. As shown in FIG. 3, the array data structure 300 comprises slots 310-330, where each slot is aligned to a cache line as a performance optimization. It should be appreciated that while FIG. 3 shows the slots being aligned with a cache line, the illustrative embodiments are not limited to such and the data stored in a slot may be larger than a cache line in some cases.

A cache line is large enough to store the information needed and allows efficient implementation of the mechanisms of the illustrative embodiments for storing the statistics during garbage collection. The statistics information received from the LGCs 118, 128 associated with the applications 110, 120 can be stored inside the array slot, e.g., array slot 310 for application 110. Furthermore, additional statistics can be calculated by the cloud runtime 112, 122 and added alongside the statistics received from the LGCs 118, 128. For example, historical data can be tracked internally. While this division of internal statistics and application related statistics (e.g., reported performance and memory usage statistics) is shown with regard to only the first slot 310, it should be appreciated that a similar division may be provided in each of the other slots of the array data structure 300. This is only one example of a data structure in which the statistical information reported by the LGCs 118, 128, and the statistical information collected from the cloud runtimes 112, 122, may be stored and other data structures of various configurations may be used without departing from the spirit and scope of the present invention.

Global Memory Management

Returning to FIG. 1, in the case that an application, such as application 110, goes out of memory (OOM), a request for additional memory is sent by the LGC 118 to the GGCM 130.

The GGCM 130 processes the request, via the global GC policy model 136, to thereby evaluate the statistical information sent by the LGC 118 requesting the additional memory, as well as the statistical information collected and maintained in the global statistics storage 140. The global GC policy model 136 applies its policies and/or machine learning training (in embodiments where the global GC policy model 136 includes a trained machine learning computer model) to generate outputs indicative of decisions and/or predictions of optimal heap allocations to the various local heaps 119, 129. In a rules-based model implementation, the global GC policy model 136 comprises predefined rules that are executed on inputs comprising the statistical information, historical statistical information, and other input features that may be informative to the determination of an optimal local heap allocation for one or more applications 110, 120 executing in the managed computing environment.

In the case of the global GC policy model 136 implementing a trained machine learning computer model, the machine learning computer model may be trained on a training dataset comprising statistical information for one or more applications, which may include historical statistical information, and corresponding ground truth local heap allocations. Based on this training data, the machine learning computer model may be trained to predict optimal local heap applications for detected patterns in statistical information from the LGCs 118, 128 as well as historical statistical information maintained in the global statistics storage. An overview of example machine learning models and machine learning processes is provided hereafter which may be used for this machine learning model and training of the global GC policy model 136.

Based on this processing, the GGCM 130 may process the OOM error and request for additional memory resources from a LGC 118 of an application 110 to determine whether to grant or deny the request. If the request is granted, then the GGCM 130, via the heap coordination logic 134 executes operations that ignore the original OOM error and increase the maximum heap size for the corresponding local heap 119. This may require the GGCM 130, via the heap coordination logic 134, signaling other LGCs 128 to release memory blocks that are not being used and reduce the maximum heap size of their local heaps 129 so that the additional portion of the shared memory may be allocated to the local heap 119 and its maximum heap size increased accordingly. If the request is denied however, the GGCM 130, via the heap coordination logic 134, may signal the LGC 118 to throw an OOM error to the application 110.

OOM errors thrown due to the heap size being out of memory can happen, for example, after garbage collection, when the current heap size is greater than the max heap size, or when trying to allocate memory exceeding the max heap size, such as when a new object is generated and needs to be stored in memory. In both occasions, a call is issued by the application 110, via the LGC 118, to the GGCM 130 to ask for additional memory. The GGCM 130 then queries the global statistics storage 140, to understand the current global footprint of the applications 110, 120 and determine if there is spare capacity in the shared memory that has not already been allocated to local heaps 119, 129. If there is spare capacity in the shared memory, then the GGCM 130 allocates a portion of the spare capacity to the requesting application's local heap, e.g., local heap 119, by modifying the maximum heap size for that local heap. The GGCM 130 returns the updated value for the max heap size to the requesting LGC 118 and application 110. Based on the returned value, the LGC 118 either throws the OOM error, e.g., if the maximum heap size is not increased, or ignores it and continues execution after updating the max heap size value, e.g., in response to the maximum heap size having been increased.

In cases where there is spare capacity, but it is currently held by an application (e.g., committed but unused memory), which may be determined from the statistics information maintained in the global statistics storage 140, the GGCM 130 signals to the application, e.g., application 120, that has the committed but unused memory in its local heap 129, to free the memory chunks of the unused memory needed to satisfy the request for more memory and release them back to the shared memory. This can happen, for example, either after the application's LGC 128 runs a garbage collection or during a safe-point where the LGC 128 regularly calls back into the GGCM 130. On a safe-point, the LGC 128 can query the GGCM 130 as to whether the unused memory of the local heap 129 should be released. In response to the GGCM 130 indicating that the unused memory should be released, the LGC 128 will go over all the unused but committed memory chunks and free them. If the local heap 129 was not reduced enough to satisfy the request for more memory by application 110 and LGC 118, then a full garbage collection across local heaps of the applications executing in the managed computing environment may be initiated and the process repeated, where this full garbage collection may be performed on a subset of the local heaps. The GGCM 130 then updates the max heap size value for the local heap 119 of the requesting application 110 via the LGC 118. Alternatively, a dedicated thread can be used to perform these operations to make non-moving applications more responsive. Then, the dedicated thread would regularly callback into the resource manager and perform GC-related operations.

Policy Based Decision Making Examples

In accordance with one or more illustrative embodiments, in order to decide whether or not to provide additional memory, the GGCM 130 makes the decision based on one or more policies, implemented by the global GC policy model 136, which are informed by the collected statistics across all applications 110, 120 via the reporting by their corresponding LGCs 118, 128. The goal of such policies is to keep latency consistent while maximizing throughput and reducing the chances of unexpected OOM errors. Examples of different policies, which may be implemented with the collected application performance and memory usage statistics reported by the LGCs 118, 128 to the GGCM 130 and stored in the global statistics storage 140, will now be discussed. It should be appreciated that these are only example policies and other policies, of various complexity, may be used without departing from the spirit and scope of the present invention.

In a first example, a basic policy may be to set a maximum global memory limit that is available to use by any application. This limit may be different from the maximum heap size but may be used to set the maximum heap size for the local heaps 119, 129 of the applications 110, 120, e.g., the maximum heap size for a local heap 119, 129 may be set to a fraction of the maximum global memory limit. If an application needs additional memory, the GGCM 130 may check to determine if this maximum global memory limit has already been reached by the local heap 119, 129 of the application 110, 120. If not, then additional memory may be provided from the shared memory. If this maximum global memory limit is reached, however, then an OOM error may be thrown. An additional policy may be that if an application is using only a fraction of its maximum heap size, e.g., less than 20%, then the surplus memory of that applications' local heap is released back to the shared memory and the maximum heap size for that application's local heap is reduced accordingly.

In a second example, an anomaly based policy may be provided in which historical statistical information from a plurality of instances of an application are collected and maintained in the global statistics storage 140. In this example, in the case of an OOM where the memory usage exceeds a maximum heap size of a local heap, and the requested additional memory is much larger, e.g., $10x$, the historical maximum memory usage as indicated in the historical statistical information, then the request for additional memory may be denied and an OOM thrown, even if there is spare capacity in the shared memory or with other applications and their local heaps. If the requested additional memory is not anomalous, then other policies, e.g., the basic policy described above with regard to the first example, may be followed to respond to the request for additional memory.

The global garbage collection aware architecture of the illustrative embodiments can handle malicious applications with anomaly-based policies, at least in part, but may operate in cooperation with the cloud runtimes and the application to make memory management decisions with regard to anomalous behavior. That is, the memory management decisions are made at the level of an individual application and thus, a malicious application cannot influence or impact an application from a different tenant. Furthermore, there is always a physical memory limit that is respected when making memory management decisions, thus removing the ability for a malicious application to impact the availability of the cloud runtime.

In a third example, an adaptive policy may be provided where each application is monitored individually and the particular policies applied to the requests for additional memory allocation may be varied based on the particular types of workloads that these applications are executing. For example, if one or more applications are running workloads that are known to be heavy weight workloads based on the workload type, i.e., the workloads require a large amount of memory, a larger percentage of the shared memory may be allocated to those application's local heaps when setting the maximum heap size for those local heaps. Similarly, if one or more applications are running workloads whose types are known to be lightweight workloads, i.e., requiring less memory utilization, then their local heap's maximum heap size may be set relatively smaller than those running workloads whose types indicate a heavier weight execution with regard to memory usage. In some cases, this policy, when applied dynamically, may initiate the reclaiming of memory resources from the lightweight applications for reallocation to heavy weight applications.

Furthermore, in addition to these global GC policies, each LGC 118, 128 uses its own local garbage collection policies that are suitable for the particular needs of the corresponding application and virtual machine. For example, applications that mostly need short-lived allocations, e.g., an Oracle Cloud Infrastructure (OCI) function that serves requests where the result is not needed after sending the response, can dynamically resize the young generation so that short-lived allocations would not trigger a full garbage collection. Thus, a two tiered architecture of garbage collection policies is formulated with local garbage collection policies being applied at the LGC 118, 128 level and global garbage collection policies being applied at the GGCM 130 level. As noted above, these policies may be implemented by a rules-based model, a trained machine learning computer model, or any other suitable computer logic model.

Advantages and Benefits

With the illustrative embodiments, when writing an application, such as a Java application, the application developer does not have to worry about setting appropriate maximum heap size values because these maximum heap size values will be automatically inferred at runtime by the GGCM 130. Additionally, the illustrative embodiments operate to autonomously tune the performance of several instances of an application running in a managed cloud environment.

The illustrative embodiments improve the OOM resiliency of applications without the need to restart the VM which can take a significant amount of time and can result in data loss. With the correct policy optimization, the illustrative embodiments improve the throughput and latency of applications that were previously over-provisioned to prevent OOM errors. Moreover, from experimental evaluation, it has been determined that the mechanisms of the illustrative embodiments result in lower and more stable memory consumption.

In addition, the illustrative embodiments can complement other garbage collector technologies and operate in conjunction therewith. For example, in some illustrative embodiments, the mechanisms described herein may be implemented along with other Java garbage collectors, such as the Z Garbage Collector (ZGC) by offering a global overview of the memory footprint and management of local heaps based on global garbage collection policies. In such illustrative embodiments, while ZGC can infer the CPU and memory utilizations of JVMs in the system, this mechanisms of the illustrative embodiments augment such capabilities by providing the ZGC with accurate insights into the real memory utilization of the system and provides dynamic adjustment of the maximum heap sizes of the local heaps accordingly.

Example Operation of Local and Global Garbage Collection

Figure 4:
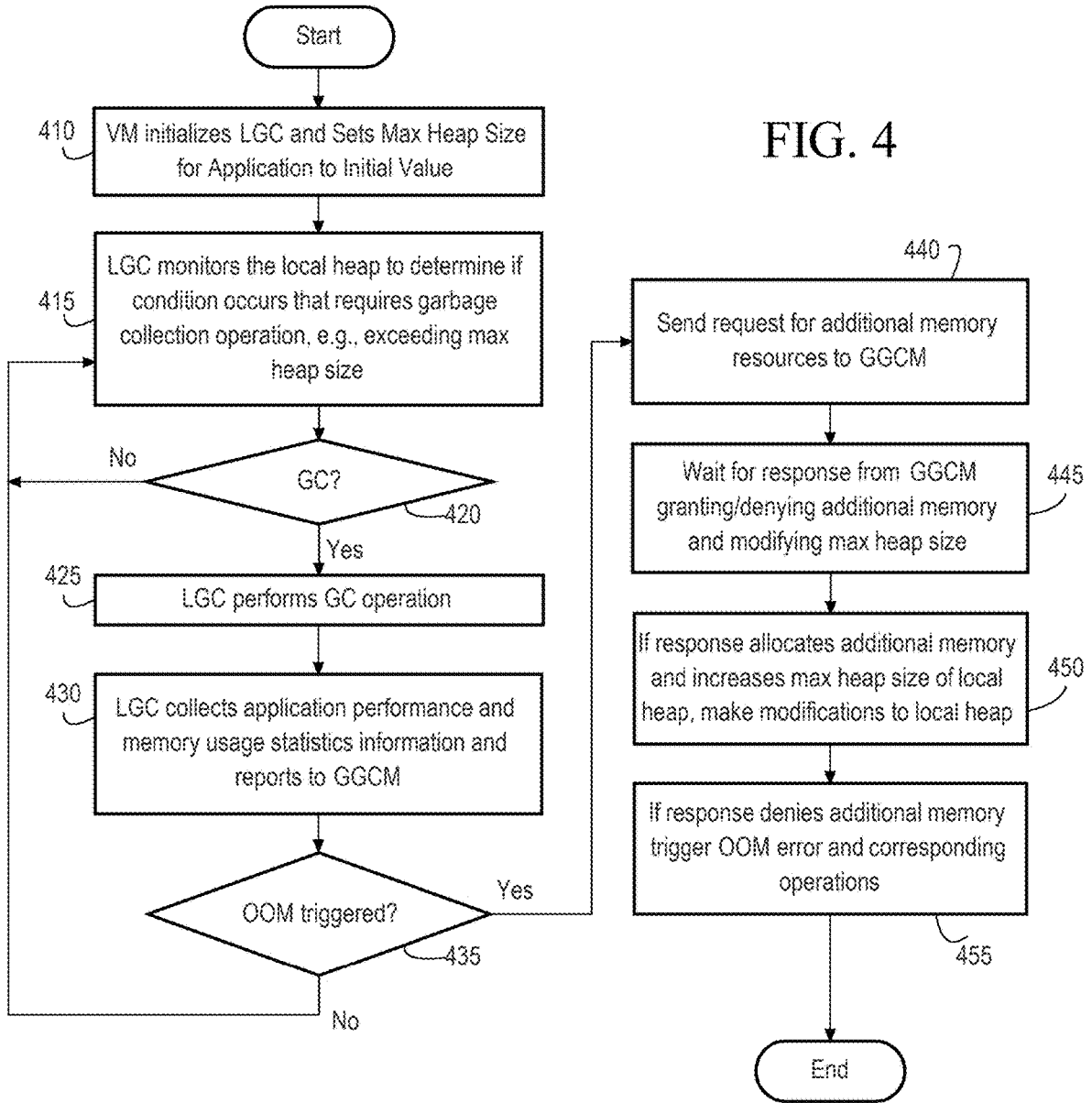
FIG. 4 is a flowchart outlining an example operation of a local garbage collector associated with an application and virtual machine in accordance with one illustrative embodiment.

FIG. 4 is a flowchart outlining an example operation of a local garbage collector associated with an application and virtual machine in accordance with one illustrative embodiment. As shown in FIG. 4, in accordance with one illustrative embodiment, the operation starts with the virtual machine initializing the local garbage collector (LGC) and setting the maximum heap size for the corresponding application to an initial value (step 410). The LGC monitors the local heap (step 415) to determine if a condition occurs that requires a garbage collection operation to be performed (step 420). This condition may be an application requesting memory from the local heap that exceeds the maximum heap size of the local heap, a garbage collection safe-point being reached, or a signaling from the global garbage collection manager (GGCM) to perform garbage collection and/or free/release memory blocks that are unused, for example.

If the condition has not occurred (step 420: NO), the LGC returns to step 415 and continues the monitoring of the local heap. If the condition has occurred (step 420: YES), then the LGC performs a garbage collection operation, i.e., identifying unused memory and reclaiming the memory (step 425). The LGC further collects application performance and memory usage statistics information and reports these to the global garbage collection manager (GGCM) (step 430).

The LGC further determines whether or not condition triggers an out-of-memory (OOM) error (step 435). If an OOM is not triggered (step 435: NO), the operation returns to step 415. If the condition triggers an OOM (step 435: YES), the LGC sends a request to the GGCM for additional memory resources (step 440) and awaits a response from the GGCM (step 445). If the response allocates additional memory resources and increases the maximum heap size of the local heap, then the LGC makes the modifications to the local heap and the memory resources are allocated from the local heap to the requesting application (step 450). If the response denies additional memory resources, the OOM error is triggered and corresponding operations as are generally known for responding to OOM errors are performed (step 455). The operation then terminates.

Figure 5:
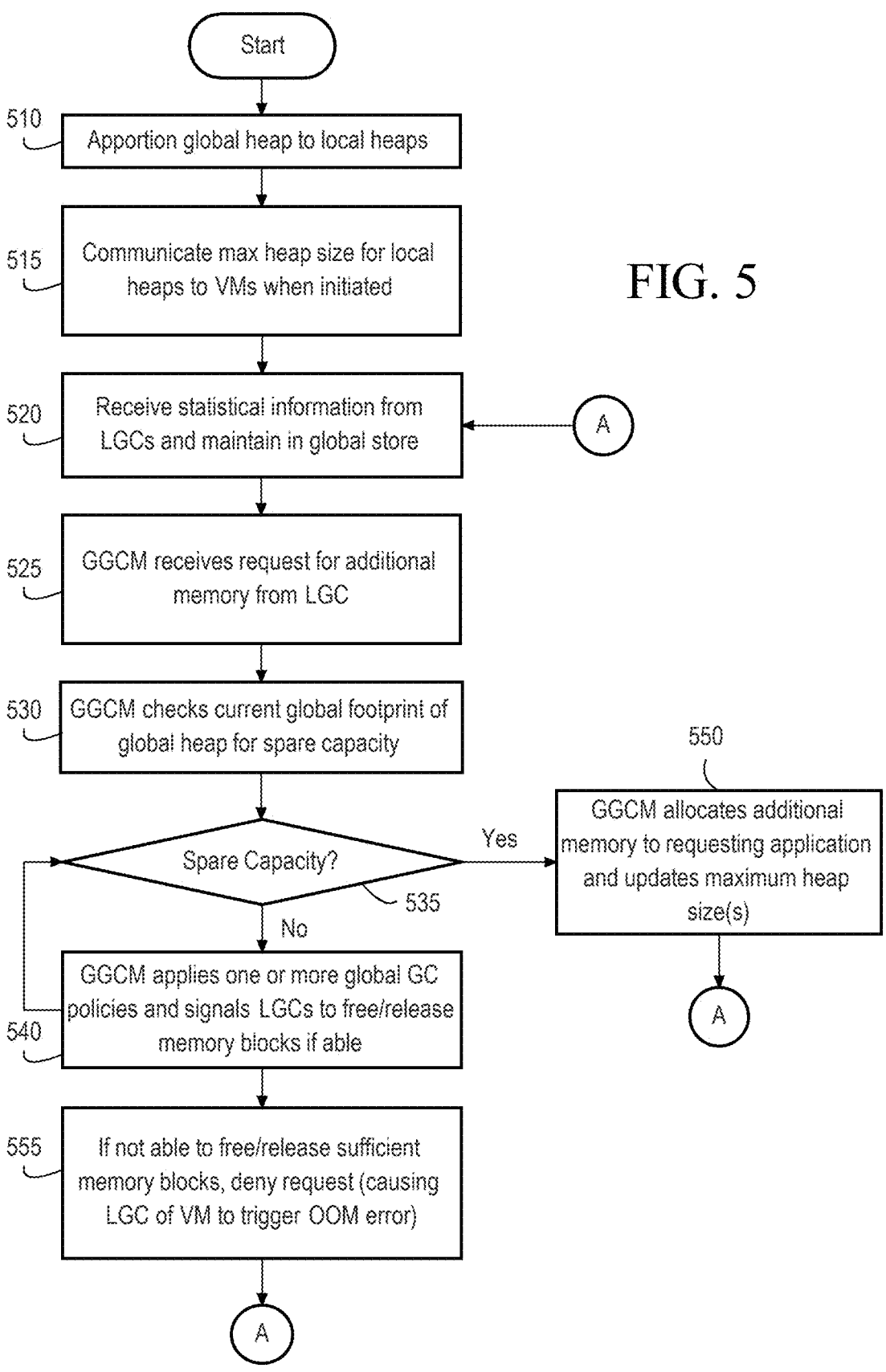
FIG. 5 is a flowchart outlining an example operation of a global garbage collection manager in accordance with one illustrative embodiment.

FIG. 5 is a flowchart outlining an example operation of a global garbage collection manager in accordance with one illustrative embodiment. As shown in FIG. 5, in accordance with one illustrative embodiment, the GGCM manages a shared memory which is apportioned out to local heaps of virtual machines for use by the application(s) executing in those virtual machines (step 510). This allocation may be based on an initial assessment, based on global garbage collection policies, as to which applications and their workloads should receive particular portions of the shared memory, e.g., apportioning greater portions to applications whose workloads require more memory resources and apportioning smaller portions to applications whose workloads require fewer memory resources. The GGCM may communicate to the virtual machines, when they are initiated, the appropriate maximum heap size to use for their local heaps (step 515). The LGCs then operate, such as in the manner described above with regard to FIG. 4, to gather and report statistical information to the GGCM.

That is, the GGCM receives statistical information from LGCs over a period of time and maintains that statistical information in a global statistical storage (step 520). At some point, the GGCM may receive a request for additional memory resources from an LGC (step 525). This may occur, for example, when the application associated with a virtual machine would trigger an out-of-memory (OOM) error and a garbage collection operation by the LGC does not provide sufficient memory resources to satisfy the request.

In response to the request for additional memory resources, the GGCM checks the current global footprint of the shared memory to determine if there is spare capacity in the shared memory to allocate additional memory resources from the shared memory to the local heap of the requesting application (step 530). If there is not sufficient spare capacity in the shared memory to satisfy the request for additional memory (step 535: NO), the GGCM may apply one or more global garbage collection policies of a global GC policy model to determine if and how to obtain the memory resources needed, such as by signaling other LGCs of other VMs to free and release memory blocks from their corresponding local heaps back to the shared memory (step 540). If there is sufficient spare capacity in the shared memory, or memory blocks may be freed and released from other local heaps back to the shared memory to provide the sufficient spare capacity (step 535: YES), then the GGCM may update the maximum heap size for the requesting application's local heap and allocate a portion of the spare capacity of the shared memory to the local heap (step 545). The maximum heap sizes of the local heaps that freed and released memory blocks is similarly updated to reflect the smaller maximum heap sizes for these local heaps (step 550).

If sufficient spare capacity could not be found in the shared memory or by causing other local heaps to free and release memory blocks, then the operation may trigger the OOM error (step 555) which is then handled in accordance with known operations. The operation, after steps 550 and 555, returns to step 520 such that this process may be dynamically performed on a continuous basis and/or in response to further requests for additional memory by the same or different applications executing in the managed computing environment. Thus, the GGCM handles garbage collection operations and maximum heap size allocations from a global perspective based on the statistical information reported by the LGCs, which in turn handle garbage collection at the local, siloed, level of the corresponding VM and application with which the LGC is associated.

Machine Learning Architecture and Training Processes

As mentioned above, the global GC policy model 136 may implement one or more trained machine learning computer models to apply global garbage collection policies. Moreover, in some cases, the LGCs may also implement such trained machine learning computer models. These trained machine learning computer models may be trained on training data comprising training samples having statistical information, e.g., application performance and memory usage statistics, similar to that reported by the LGCs to the GGCM, and corresponding ground truth data indicating a desired maximum heap size configuration for the particular training sample. In this way, the machine learning (ML) computer model may be trained to recognize patterns of statistical information and correlate those patterns with appropriate maximum heap size configurations, which can then be used to drive decision making as to heap size allocations, granting/denying requests for additional memory, signaling release of memory blocks by applications, and the like.

The training of the ML computer model(s) may be performed in accordance with a ML training operation. The following provides an overview of example ML training processes in a ML architecture which may be used to train the ML models of the GGCM and/or the LGCs in the illustrative embodiments. It should be appreciated that this is an overview and modifications to the described ML training process may be performed without departing from the spirit and scope of the present invention.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depend on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria are met.

In a software implementation, when a machine learning model is referred to as receiving an input, being executed, and/or generating an output or prediction, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of the best breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neurons.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as a vector. Training data comprises multiple inputs, each being referred to as a sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Fewer neurons means fewer activation values need be computed, and/or fewer derivative values need be computed during training.

Properties of matrices used to implement a neural network correspond to neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in a matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that are not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depend on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occur as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2 (1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

DBMS Overview

As mentioned previously, the applications executing in the computing environment in which one or more of the illustrative embodiments may be implemented, may process workloads that vary based on the desired implementation. In some illustrative embodiments, these applications may process workloads associated with databases and database management systems and thus, the mechanisms of the illustrative embodiments may be implemented to improve the processing of database queries in database systems. The following is a description of a database system and its components with which the improved garbage collection technologies and dynamic modification of application maximum heap size may be employed.

A database management system (DBMS) manages a database. A DBMS may comprise one or more database servers. A database comprises database data and a database dictionary that is stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, a branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network.

Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains definition metadata that defines properties of the database object. For example, definition metadata in a database dictionary defining a database table may specify the attribute names and data types of the attributes, and one or more files or portions thereof that store data for the table. Definition metadata in the database dictionary defining a procedure may specify a name of the procedure, the procedure's arguments, and the return data type, and the data types of the arguments and may include source code and a compiled version thereof.

A database dictionary is referred to by a DBMS to determine how to execute database commands submitted to a DBMS. Database commands can access or execute the database objects that are defined by the dictionary. Such database objects may be referred to herein as first-class citizens of the database. A first-class citizen is associated with a database object name, which can be referenced in database commands to identify the first-class citizen to DBMS. The database object name is mapped or otherwise associated with the database object. The DBMS refers to the definition metadata of the first-class citizen to determine how to access or execute the first-class citizen.

A database object may be defined by the database dictionary, but the definition metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., java file) and the compiled version of the class (i.e., class file).

Native data types are data types supported by a DBMS "out-of-the-box." Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data type and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
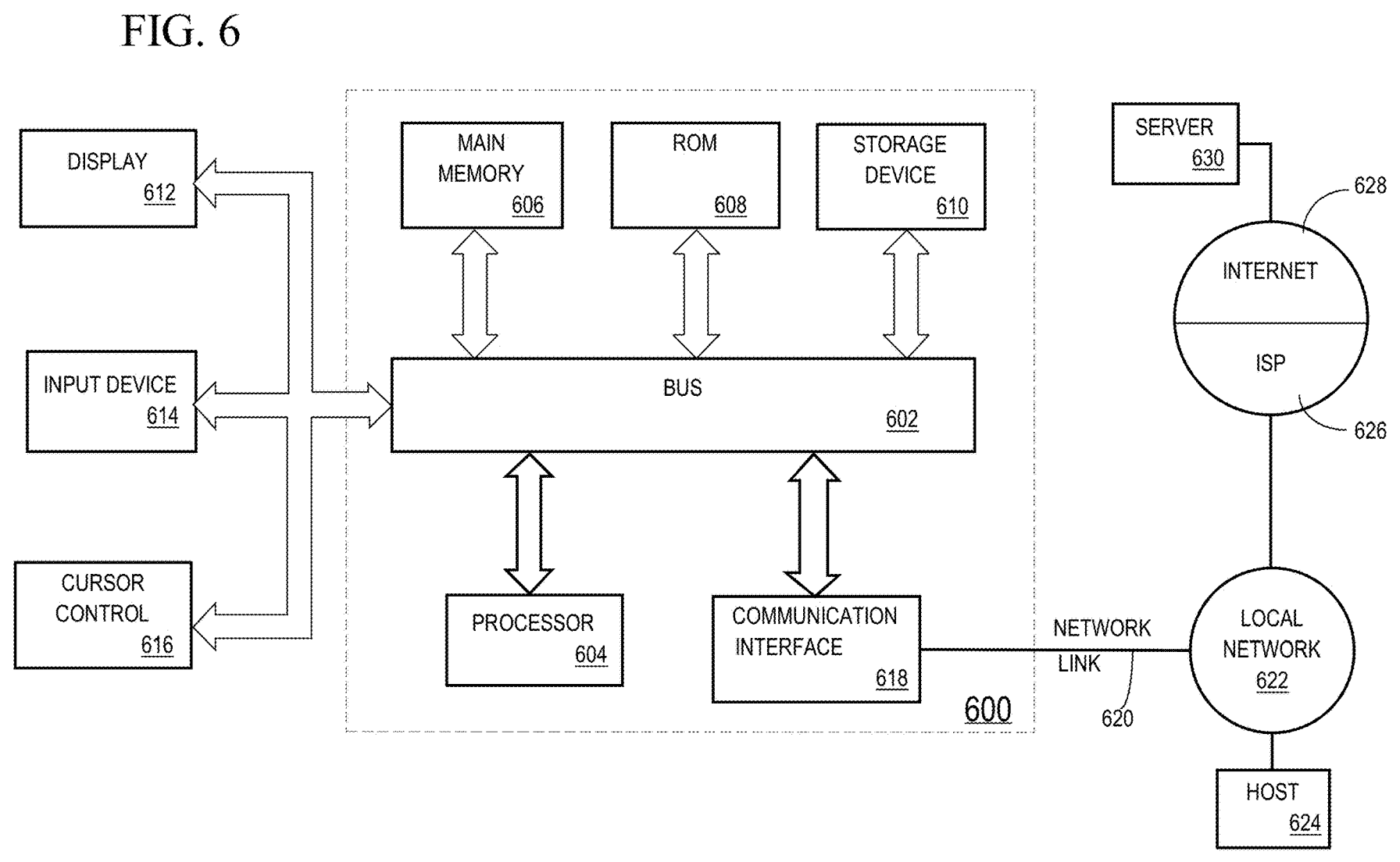

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computer system 600 upon which aspects of the illustrative embodiments may be implemented. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

executing, in a managed cloud computing environment, a plurality of applications that each have a corresponding local garbage collector in a plurality of local garbage collectors;

executing a global garbage collection manager, of the managed cloud computing environment, which communicates with the local garbage collectors via one or more cloud runtimes, wherein the global garbage collection manager maintains global statistics information comprising statistics information communicated to the global garbage collection manager from each of the local garbage collectors;

generating, by a first local garbage collector associated with a first application, first statistics information of the first application in response to a first local garbage collection operation executed by the first local garbage collector;

communicating, from the first local garbage collector, the first statistics information to the global garbage collection manager; and dynamically modifying, by the global garbage collection manager, a heap size associated with the first application, based on the first statistics information and the global statistics information.

2. The method of claim 1, wherein dynamically modifying the heap size is performed by the global garbage collection manager while the first application is executing in the managed cloud computing environment, and without restarting a virtual machine on which the first application is executing.

3. The method of claim 1, wherein the first statistics information comprises memory usage statistics and application performance statistics.

4. The method of claim 1, wherein the first statistics information comprises at least one of used heap size before and after garbage collection, historical maximum memory usage before and after garbage collection, current heap size, maximum heap size, committed memory, percentage of time spent in garbage collection, application latency and throughput, or memory usage.

5. The method of claim 1, wherein the global garbage collection manager stores, for each application in the plurality of applications, historical statistical information comprising the statistics information communicated, from a local garbage collector corresponding to the application, to the global garbage collection manager over a period of time, and wherein the global garbage collection manager dynamically modifies the heap size based on at least first historical statistics information of the first application.

6. The method of claim 5, further comprising performing, for at least one application in the plurality of applications, an anomaly detection based on historical statistical information associated with the at least one application.

7. The method of claim 6, wherein the anomaly detection comprises detecting an anomaly in response to a request for additional memory from the at least one application is requesting a predetermined larger amount of memory than a historical maximum memory usage by the at least one application, and in response the anomaly being detected, denying the request and initiating an out-of-memory error.

8. The method of claim 1, wherein the global statistics information is stored in a cloud runtime memory associated with the managed cloud computing environment.

9. The method of claim 8, wherein communicating the first statistics information comprises the first local garbage collector using a message passing application programming interface (API) to communicate the first statistics information to the cloud runtime memory.

10. The method of claim 1, wherein dynamically modifying the heap size comprises initiating a global garbage collection across all of the plurality of garbage collectors.

11. The method of claim 1, wherein dynamically modifying the heap size is performed by the global garbage collection manager in response to receiving a request from the first application requesting additional memory in response to an out-of-memory indicator of the first application.

12. The method of claim 1, wherein the global statistics information comprises an array data structure where each slot of the array data structure is aligned to a cache line and stores statistics information of a corresponding application in the plurality of applications.

13. The method of claim 1, wherein dynamically modifying the heap size comprises signaling, by the global garbage collection manager, at least one second application in the plurality of applications to free one or more memory chunks allocated to the at least one second application and reallocate the freed one or more memory chunks to the first application.

14. The method of claim 1, wherein dynamically modifying the heap size comprises executing, by the global garbage collection manager, a global garbage collection policy comprising:

setting a maximum global memory limit that is available to use by the plurality of applications;

in response to the first application requesting additional memory, checking whether the maximum global memory limit is reached;

in response to the maximum global memory limit not being reached, allocating additional memory to the first application to dynamically modify the heap size; and in response to the maximum global memory limit having being reached, triggering an out-of-memory error.

15. The method of claim 14, wherein the global garbage collection policy further comprises:

in response to the triggering of an out-of-memory error, determining whether a second application in the plurality of applications is using a fraction of a second heap allocated to the second application; and in response to the second application using a fraction of the second heap, releasing back to the global garbage collection manager, a portion of the second heap not being used by the second application and reducing the maximum heap size of the second heap.

16. The method of claim 1, wherein dynamically modifying the heap size comprises dynamically adjusting heap sizes allocated to each of the applications in the plurality of applications based on workloads executed by the applications in the plurality of applications, such that heap sizes allocated to applications whose workloads require relatively larger amounts of memory are greater than heap sizes allocated to applications that run lightweight workloads requiring relatively smaller amounts of memory.

17. One or more non-transitory computer-readable media storing instructions which, when executed by one or more processors, cause the one or more processors to:

execute, in a managed cloud computing environment, a plurality of applications that each have a corresponding local garbage collector in a plurality of local garbage collectors;

execute a global garbage collection manager, of the managed cloud computing environment, which communicates with the local garbage collectors via one or more cloud runtimes, wherein the global garbage collection manager maintains global statistics information comprising statistics information communicated to the global garbage collection manager from each of the local garbage collectors;

generate, by a first local garbage collector associated with a first application, first statistics information of the first application in response to a first local garbage collection operation executed by the first local garbage collector;

communicate, from the first local garbage collector, the first statistics information to the global garbage collection manager; and dynamically modify, by the global garbage collection manager, a heap size associated with the first application, based on the first statistics information and the global statistics information.

18. The one or more non-transitory computer-readable media of claim 17, wherein dynamically modifying the heap size is performed by the global garbage collection manager while the first application is executing in the managed cloud computing environment, and without restarting a virtual machine on which the first application is executing.

19. The one or more non-transitory computer-readable media of claim 17, wherein dynamically modifying the heap size comprises executing, by the global garbage collection manager, a global garbage collection policy comprising:

setting a maximum global memory limit that is available to use by the plurality of applications;

in response to the first application requesting additional memory, checking whether the maximum global memory limit is reached;

in response to the maximum global memory limit not being reached, allocating additional memory to the first application to dynamically modify the heap size; and in response to the maximum global memory limit having being reached, triggering an out-of-memory error.

20. An apparatus, comprising:

a processor; and a memory coupled to the processor, wherein the memory comprises instructions which, when executed by the processor, cause the processor to execute the process comprising:

executing, in a managed cloud computing environment, a plurality of applications that each have a corresponding local garbage collector in a plurality of local garbage collectors;

executing a global garbage collection manager, of the managed cloud computing environment, which communicates with the local garbage collectors via one or more cloud runtimes, wherein the global garbage collection manager maintains global statistics information comprising statistics information communicated to the global garbage collection manager from each of the local garbage collectors;

generating, by a first local garbage collector associated with a first application, first statistics information of the first application in response to a first local garbage collection operation executed by the first local garbage collector;

communicating, from the first local garbage collector, the first statistics information to the global garbage collection manager; and dynamically modifying, by the global garbage collection manager, a heap size associated with the first application, based on the first statistics information and the global statistics information.

* * * * *